United States Patent
Kwon et al.

(10) Patent No.: US 9,893,954 B2
(45) Date of Patent: Feb. 13, 2018

(54) METHOD AND APPARATUS FOR TUNING CAN COMMUNICATION MODEL

(71) Applicants: Hyundai Motor Company, Seoul (KR); Wise Automotive Corporation, Seoul (KR)

(72) Inventors: Hae Yun Kwon, Gyeonggi-do (KR); Xuefeng Jin, Seoul (KR); Jea Hong Park, Seoul (KR)

(73) Assignees: Hyundai Motor Company, Seoul (KR); Wise Automotive Corporation, Seoul (KR)

( * ) Notice: Subject to any disclaimer, the term of this patent is extended or adjusted under 35 U.S.C. 154(b) by 268 days.

(21) Appl. No.: 14/798,880

(22) Filed: Jul. 14, 2015

(65) Prior Publication Data

US 2016/0261467 A1  Sep. 8, 2016

(30) Foreign Application Priority Data

Mar. 4, 2015  (KR) .......................... 10-2015-0030253

(51) Int. Cl.
*H04L 12/40* (2006.01)
*H04L 12/24* (2006.01)

(52) U.S. Cl.
CPC ............ *H04L 41/145* (2013.01); *H04L 12/40* (2013.01); *H04L 2012/40215* (2013.01); *H04L 2012/40273* (2013.01)

(58) Field of Classification Search
CPC .............................. H04L 12/40; H04L 41/145
See application file for complete search history.

(56) References Cited

U.S. PATENT DOCUMENTS

| | | | |
|---|---|---|---|
| 2014/0189621 A1* | 7/2014 | Kim .................... | G06F 17/5045 716/103 |
| 2016/0154406 A1* | 6/2016 | Im ...................... | G05B 23/0221 702/188 |
| 2016/0261467 A1* | 9/2016 | Kwon ................... | H04L 41/145 |

FOREIGN PATENT DOCUMENTS

| | | |
|---|---|---|
| JP | 2007-201697 A | 8/2007 |
| JP | 2012-178035 A | 9/2012 |
| KR | 10-2007-0067934 A | 6/2007 |
| KR | 10-2008-0018534 | 2/2008 |
| KR | 10-2012-0026231 | 3/2012 |
| KR | 10-2014-0078344 | 6/2014 |
| WO | 2010-137114 A1 | 12/2010 |

\* cited by examiner

*Primary Examiner* — Albert Wang
(74) *Attorney, Agent, or Firm* — Mintz Levin Cohn Ferris Glovsky and Popeo, P.C.; Peter F. Corless

(57) ABSTRACT

A method of tuning a controller area network (CAN) communication model includes: measuring a CAN signal waveform, dividing the CAN signal waveform into a steady period and a dynamic period, determining a parameter for the steady period, determining a parameter for the dynamic period, modeling a CAN line using the parameter for the steady period and the parameter for the dynamic period, and performing error analysis on the CAN line.

15 Claims, 3 Drawing Sheets

METHOD AND APPARATUS FOR TUNING CAN COMMUNICATION MODEL

CROSS-REFERENCE TO RELATED APPLICATION

This application claims the benefit of and priority to Korean Patent Application No. 10-2015-0030253, filed on Mar. 4, 2015, which is hereby incorporated by reference as if fully set forth herein.

BACKGROUND OF THE DISCLOSURE

Technical Field

The present disclosure relates generally to a method and apparatus for tuning a controller area network (CAN) communication model, and more particularly, to a method and apparatus for tuning a CAN communication model using data obtained by measuring a model and a parameter for simulation of a high-speed CAN physical layer.

Discussion of the Related Art

Various electronic systems are installed and used in recently developed vehicles. Such electronic systems include real-time control applications associated with an electronic boot release, an electromotive mirror adjustment device, a rain detector, a sunroof, a weather management device, power windows, seat adjusting devices, a power train, stability control, an anti-lock brake system (ABS), a draft control, an active suspension, an engine management device, the Internet, a shift gear, multimedia devices such as a digital television (TV), and the like.

Typically, numerous cables are required for a wiring device that is used for connection between the above electronic systems, and such cables occupy a significant portion of the weight and manufacturing costs of a vehicle. Accordingly, all of these systems can be connected to one common network bus in the vehicle, similar to a method for connecting desktop personal computers (PCs) in an office, thereby reducing the amount of wires in the vehicle and reducing manufacturing costs. This network is referred to as a controller area network (CAN).

However, there is a problem in that a parameter needs to be measured using a precision measurement machine in order to establish the conventional high-speed CAN physical layer simulation model.

SUMMARY OF THE DISCLOSURE

Accordingly, the present disclosure is directed to a method and apparatus for tuning a controller area network (CAN) communication model that substantially obviates one or more problems due to limitations and disadvantages of the related art. An object of the present disclosure is to provide a method and apparatus for tuning a CAN communication model, for measuring a CAN signal waveform and tuning a parameter constituting a CAN line using the CAN signal waveform.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with embodiments of the present disclosure, a method of tuning a CAN communication model includes: measuring a CAN signal waveform; dividing the CAN signal waveform into a steady period and a dynamic period; determining a parameter for the steady period; determining a parameter for the dynamic period; modeling a CAN line using the parameter for the steady period and the parameter for the dynamic period; and performing error analysis on the CAN line.

The steady period may be a period in which change in the CAN signal waveform is less than a predetermined size, and the dynamic period may be a period in which change in the CAN signal waveform is greater than or equal to the predetermined size.

The determining of the parameter for the steady period may include: acquiring a voltage average of the steady period; acquiring a transmitting/receiving voltage matrix using the voltage average; acquiring a resistance distribution matrix using the transmitting/receiving voltage matrix; performing a simulation using the resistance distribution matrix; and determining whether the resistance distribution matrix has changed based on the performed simulation.

The performing of the simulation may include performing the simulation further using a theoretical inductance and a theoretical capacitance.

The determining of the parameter for the dynamic period may include: acquiring an ascending time and a descending time of the dynamic period; acquiring a dynamic characteristic matrix using the ascending time and the descending time; acquiring an inductance and capacitance distribution matrix using the dynamic characteristic matrix; performing a simulation using the inductance and capacitance distribution matrix; and determining whether the inductance and capacitance distribution matrix has changed based on the performed simulation.

The performing of the simulation may include performing the simulation further using the resistance distribution matrix.

The method may further include updating the parameter for the steady period and the parameter for the dynamic period.

Furthermore, according to embodiments of the present disclosure, an apparatus for tuning a controller area network (CAN) communication model includes: a measurer measuring a CAN signal waveform; a parameter unit dividing the CAN signal waveform into a steady period and a dynamic period, determining a parameter for the steady period, and determining a parameter for the dynamic period; a modeling unit modeling a CAN line using the parameter for the steady period and the parameter for the dynamic period; and a simulation unit performing error analysis on the CAN line.

The steady period may be a period in which change in the CAN signal waveform is less than a predetermined size, and the dynamic period may be a period in which change in the CAN signal waveform is greater than or equal to the predetermined size.

The parameter unit may acquire a voltage average of the steady period, acquire a transmitting/receiving voltage matrix using the voltage average, and acquire a resistance distribution matrix using the transmitting/receiving voltage matrix. The simulation unit may perform a simulation using the resistance distribution matrix and determine whether the resistance distribution matrix has changed based on the performed simulation.

The simulation unit may perform the simulation further using a theoretical inductance and a theoretical capacitance.

The parameter unit may acquire an ascending time and a descending time of the dynamic period, acquire a dynamic characteristic matrix using the ascending time and the descending time, and acquire an inductance and capacitance distribution matrix using the dynamic characteristic matrix. The simulation unit may perform a simulation using the inductance and capacitance distribution matrix and determine whether the inductance and capacitance distribution matrix has changed based on the performed simulation.

The simulation unit may perform the simulation further using the resistance distribution matrix.

The apparatus may further include a parameter database updating the parameter for the steady period and the parameter for the dynamic period.

Furthermore, according to embodiments of the present disclosure, a non-transitory computer readable medium containing program instructions for tuning a controller area network (CAN) communication model includes: program instructions that measure a CAN signal waveform; program instructions that divide the CAN signal waveform into a steady period and a dynamic period; program instructions that determine a parameter for the steady period; program instructions that determine a parameter for the dynamic period; program instructions that model a CAN line using the parameter for the steady period and the parameter for the dynamic period; and program instructions that perform error analysis on the CAN line.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
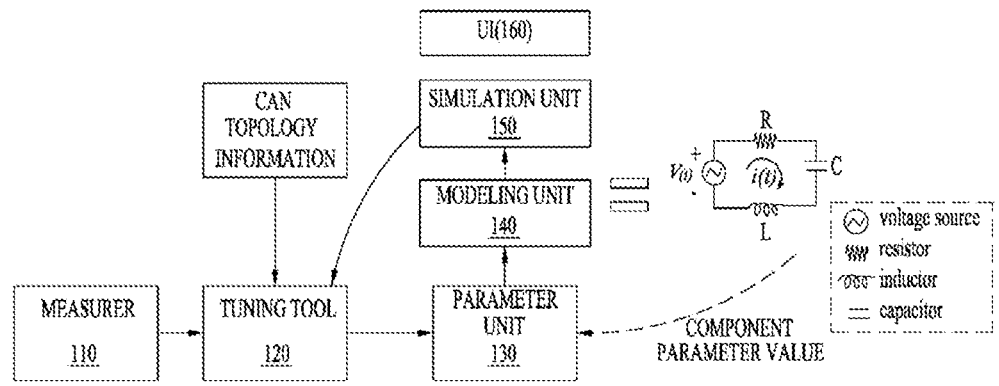
FIG. 1 is a diagram illustrating an example of a controller area network (CAN) line tuning apparatus to which the present disclosure is applied.

Terms or words used herein shall not be limited to dictionary meanings and need to be interpreted as having meanings corresponding to technical aspects of the embodiments of the present disclosure under the principle that the inventor can appropriately define the terms so as to most suitably express the embodiments of the present disclosure. Accordingly, elements described in the specification and shown in the accompanying drawings are merely examples and are not used to express all technical aspects, and thus it will be understood by those of ordinary skill in the art that various equivalents and changes in form and details may be made therein when the application is filed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a diagram illustrating an example of a controller area network (CAN) line tuning apparatus to which the present disclosure is applied.

As shown in FIG. 1, a measurer 110 may measure a CAN signal waveform. A tuning tool 120 may acquire an actually measured waveform and CAN topology information and tune a parameter using the actually measured waveform and the CAN topology information. In addition, the tuning tool 120 may tune the parameter using a simulation result of a simulation unit 150. The CAN topology information may include information about a method for connection between elements of CAN communication.

A parameter unit 130 may indicate a parameter value through the tuning result determined by the tuning tool 120. The tuning result may be a device value or an estimated value of each component of a CAN line model circuit and each component may include at least one of a power source, a resistor R, an inductance L, and a capacitance C.

A model unit 140 may embody a CAN line model circuit using a parameter value configured in each line.

The simulation unit 150 may perform simulation to acquire the simulation result. The simulation result may include error information based on transmitted and received information of CAN communication.

A user interface (UI) 160 may allow a user to see a current CAN line model and to check whether tuning proceeds.

Hereinafter, an example of analyzing an actually measured waveform will be described.

Figure 2:
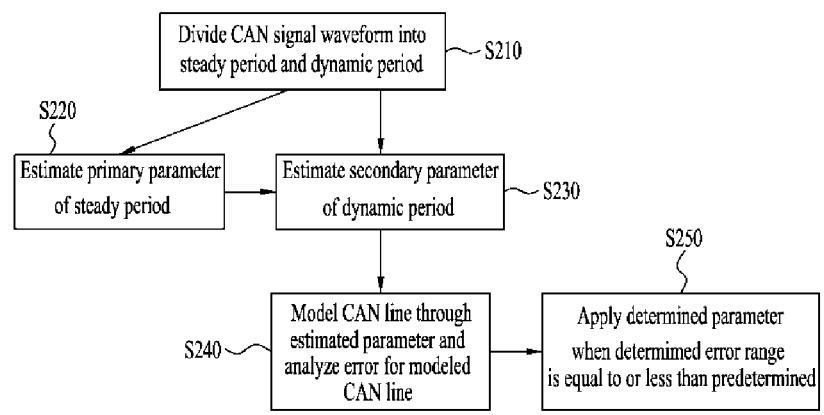
FIG. 2 is a diagram illustrating an example of a procedure for tuning a CAN line according to embodiments of the present disclosure.

FIG. 2 is a diagram illustrating an example of a procedure for tuning a CAN line according to embodiments of the present disclosure.

When a CAN communication signal waveform is measured, a period of a CAN communication signal waveform may be divided (S210). The period of the CAN communication signal waveform may be divided into a steady period and a dynamic period. The steady period may indicate a period having a signal with a constant magnitude and the dynamic period may indicate a period having a signal that is remarkably changed. The steady period and the dynamic period may be differentiated according to whether change in CAN signal waveform is greater or smaller than a predetermined size.

In the steady period, resistance may be inferred using a transmitting/receiving voltage of a current portion of a waveform. The resistance may include all resistances distributed on a wire, a connector, and an electronic control unit (ECU) of a line. In addition, with regard to the wire, resistance per unit length may be extracted as a target parameter.

In the dynamic period, an inductance and a capacitance may be inferred through portions of ascending and descending periods, in which a waveform is changed. With regard to a wire, inductance and capacitance per unit length may be extracted as a target parameter, and with regard to an ECU, only a capacitance may be inferred.

Primary parameter estimation may be performed on a steady period signal (S220). The primary parameter estimation may be estimation of the steady period signal and may refer to preferential estimation of a parameter that affects a current component of the steady period. The primary parameter estimation will be described below in detail with reference to FIG. 3.

Secondary parameter estimation may be performed on at least one of a steady period signal and a dynamic period signal on which the primary parameter estimation has been performed (S230). The secondary parameter estimation may be estimation with respect to a steady period or a dynamic period and may refer to a parameter that affects components except for a current component. The secondary parameter estimation will be described below in detail with reference to FIG. 4.

A CAN line may be modeled through the estimated parameter and error of the modeled CAN line may be analyzed (S240). An error range may be determined by performing probability analysis on the parameter estimated through the primary parameter estimation and the secondary parameter estimation. In addition, when the determined error range is equal to or greater than a predetermined value, the primary parameter estimation and the secondary parameter estimation may be re-performed.

When the determined error range is equal to or less than a predetermined value, the determined parameter may be applied (S250).

Hereinafter, a method of tuning a steady period will be described.

Figure 3:
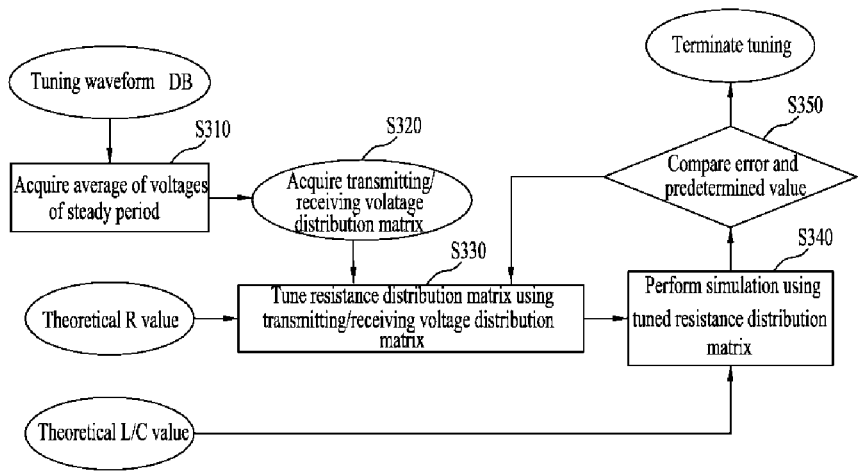
FIG. 3 is a diagram illustrating an example of tuning a steady period of a waveform according to embodiments of the present disclosure.

FIG. 3 is a diagram illustrating an example of tuning a steady period of a waveform according to embodiments of the present disclosure.

An average of voltages of the steady period may be acquired (S310). Here, the average may be one of arithmetic mean, geometric mean, harmonic mean, and root mean square (RMS). In order to acquire an average of voltages, pre-stored tuning information may be used. The pre-stored tuning information will be re-described below.

A transmitting/receiving voltage distribution matrix may be acquired using the average of voltages (S320).

A resistance distribution matrix may be tuned using the transmitting/receiving voltage distribution matrix (S330). The resistance distribution matrix may be tuned by setting a theoretical value as an initial value and using the transmitting/receiving voltage distribution matrix.

Simulation may be performed using the tuned resistance distribution matrix (S340). The simulation may be performed using resistance of resistance distribution matrix, a theoretical inductance, and a theoretical capacitance. The simulation may be performed to analyze error of a CAN line using the current resistance distribution matrix.

The error and a predetermined value may be compared to one another (S350). When the error is greater than the predetermined value, operation S330 for acquisition of the resistance distribution matrix may be re-performed. Operation S330 may be performed until the error becomes smaller than the predetermined value. On the other hand, when the error is smaller than the predetermined value, tuning may be terminated.

Hereinafter, a method of tuning a dynamic period will be described.

Figure 4:
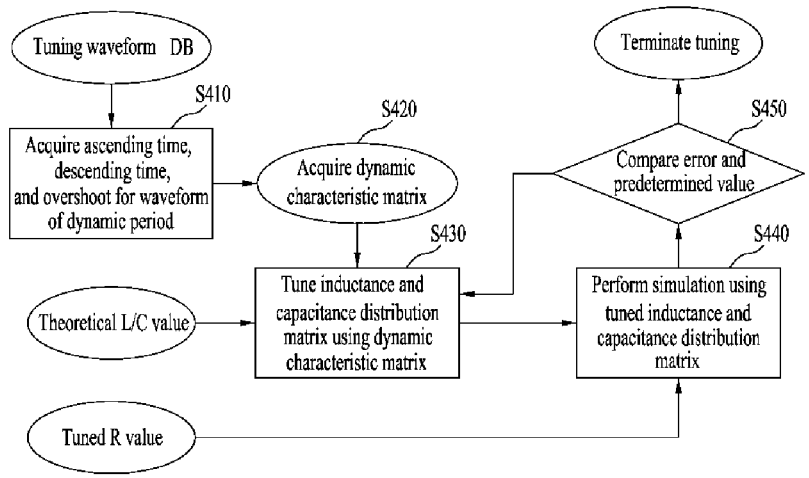
FIG. 4 is a diagram illustrating an example of tuning a dynamic period according to embodiments of the present disclosure.

FIG. 4 is a diagram illustrating an example of tuning a dynamic period according to embodiments of the present disclosure.

Ascending time, descending time, and overshoot of a waveform of the dynamic period may be acquired (S410). In order to acquire the ascending time, descending time, and overshoot of waveform, pre-stored turning information may be used. The pre-stored turning information will be re-described below.

A dynamic characteristic matrix may be acquired using the ascending time, the descending time, and the overshoot (S420).

An inductance and capacitance distribution matrix may be tuned using the dynamic characteristic matrix (S430). The inductance and capacitance distribution matrix may be tuned by setting theoretical inductance and capacitance values as an initial value and using the dynamic characteristic matrix.

Simulation may be performed using the tuned inductance and capacitance distribution matrix (S440). The simulation may be performed using the inductance and capacitance distribution matrix and the tuned resistance in FIG. 3. The simulation may be performed to analyze error of a CAN line using the inductance and capacitance distribution matrix.

The error and a predetermined value may be compared (S450). When the error is greater than the predetermined value, operation S430 for acquisition of the inductance and capacitance distribution matrix may be re-performed.

Operation S430 may be performed until the error becomes smaller than the predetermined value. On the other hand, when the error is smaller than the predetermined value, tuning may be terminated.

Hereinafter, an example of updating a parameter database using a parameter, tuning of which has been completed, will be described.

Figure 5:
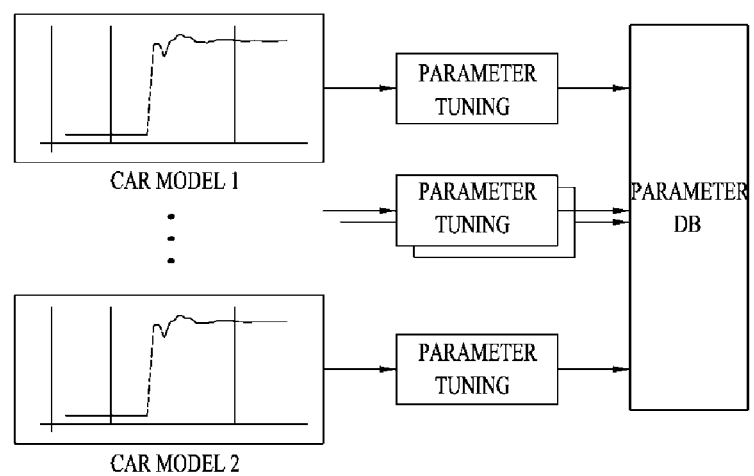
FIG. 5 is a diagram illustrating an example of updating a parameter database using a parameter, tuning of which has been completed, according to embodiments of the present disclosure.

FIG. 5 is a diagram illustrating an example of updating a parameter database using a parameter, tuning of which has been completed, according to embodiments of the present disclosure.

As shown in FIG. 5, the parameter database may be updated by adding the result obtained by performing parameter tuning as described with reference to FIGS. 3 and 4 and the result obtained by performing parameter tuning in a plurality of car models (i.e., car model 1 to car model N) to the parameter database. The updated parameter database may be used in future parameter tuning so as to provide pre-stored tuning information.

As described above, according to the present disclosure, costs for parameter tuning may be reduced with inexpensive equipment and tuning periods. Additionally, technology required during a tuning procedure can be embodied as a tool, and thus, anyone can easily perform the tuning procedure. Dependency upon measurement error may also be reduced so as to also estimate a parameter that is accurately measured with difficulty. Furthermore, various tables may be accumulated so as to test performance of CAN communication without actual measurement.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method of tuning a controller area network (CAN) communication model, the method comprising:
   measuring a CAN signal waveform;
   dividing the CAN signal waveform into a steady period and a dynamic period;
   determining a parameter for the steady period;
   determining a parameter for the dynamic period;
   modeling a CAN line using the parameter for the steady period and the parameter for the dynamic period; and
   performing error analysis on the CAN line.

2. The method according to claim 1, wherein:
   the steady period is a period in which change in the CAN signal waveform is less than a predetermined size, and
   the dynamic period is a period in which change in the CAN signal waveform is greater than or equal to the predetermined size.

3. The method according to claim 1, wherein the determining of the parameter for the steady period comprises:
   acquiring a voltage average of the steady period;
   acquiring a transmitting/receiving voltage matrix using the voltage average;
   acquiring a resistance distribution matrix using the transmitting/receiving voltage matrix;
   performing a simulation using the resistance distribution matrix; and
   determining whether the resistance distribution matrix has changed based on the performed simulation.

4. The method according to claim 3, wherein the performing of the simulation comprises:
   performing the simulation further using a theoretical inductance and a theoretical capacitance.

5. The method according to claim 1, wherein the determining of the parameter for the dynamic period comprises:
   acquiring an ascending time and a descending time of the dynamic period;
   acquiring a dynamic characteristic matrix using the ascending time and the descending time;
   acquiring an inductance and capacitance distribution matrix using the dynamic characteristic matrix;
   performing a simulation using the inductance and capacitance distribution matrix; and
   determining whether the inductance and capacitance distribution matrix has changed based on the performed simulation.

6. The method according to claim 5, wherein the performing of the simulation comprises:
   performing the simulation further using the resistance distribution matrix.

7. The method according to claim 1, further comprising updating the parameter for the steady period and the parameter for the dynamic period.

8. An apparatus for tuning a controller area network (CAN) communication model, the apparatus comprising:
   a measurer measuring a CAN signal waveform;
   a parameter unit dividing the CAN signal waveform into a steady period and a dynamic period, determining a parameter for the steady period, and determining a parameter for the dynamic period;
   a modeling unit modeling a CAN line using the parameter for the steady period and the parameter for the dynamic period; and
   a simulation unit performing error analysis on the CAN line.

9. The apparatus according to claim 8, wherein:
   the steady period is a period in which change in the CAN signal waveform is less than a predetermined size, and
   the dynamic period is a period in which change in the CAN signal waveform is greater than or equal to the predetermined size.

10. The apparatus according to claim 8, wherein:
    the parameter unit acquires a voltage average of the steady period, acquires a transmitting/receiving voltage matrix using the voltage average, and acquires a resistance distribution matrix using the transmitting/receiving voltage matrix; and
    the simulation unit performs a simulation using the resistance distribution matrix and determines whether the resistance distribution matrix has changed based on the performed simulation.

11. The apparatus according to claim 10, wherein the simulation unit performs the simulation further using a theoretical inductance and a theoretical capacitance.

12. The apparatus according to claim 8, wherein:
    the parameter unit acquires an ascending time and a descending time of the dynamic period, acquires a dynamic characteristic matrix using the ascending time and the descending time, and acquires an inductance and capacitance distribution matrix using the dynamic characteristic matrix; and
    the simulation unit performs a simulation using the inductance and capacitance distribution matrix and determines whether the inductance and capacitance distribution matrix has changed based on the performed simulation.

13. The apparatus according to claim 12, wherein the simulation unit performs the simulation further using the resistance distribution matrix.

14. The apparatus according to claim 8, further comprising a parameter database updating the parameter for the steady period and the parameter for the dynamic period.

15. A non-transitory computer readable medium containing program instructions for tuning a controller area network (CAN) communication model, the computer readable medium comprising:
   program instructions that measure a CAN signal waveform;
   program instructions that divide the CAN signal waveform into a steady period and a dynamic period;
   program instructions that determine a parameter for the steady period;
   program instructions that determine a parameter for the dynamic period;
   program instructions that model a CAN line using the parameter for the steady period and the parameter for the dynamic period; and
   program instructions that perform error analysis on the CAN line.

* * * * *